(12) United States Patent
Bagrianski et al.

(10) Patent No.: US 12,717,056 B2
(45) Date of Patent: Aug. 25, 2026

(54) GEOPHYSICAL SURVEYING APPARATUS, SYSTEM AND METHOD

(71) Applicant: Expert Geophysics Limited, Toronto (CA)

(72) Inventors: Andrei Bagrianski, Toronto (CA); Alexander Prikhodko, Barrie (CA); Mikhail Kuzmin, Newmarket (CA); Petr Kuzmin, Aurora (CA)

(73) Assignee: Expert Geophysics Limited, Toronto (CA)

( * ) Notice: Subject to any disclaimer, the term of this patent is extended or adjusted under 35 U.S.C. 154(b) by 435 days.

(21) Appl. No.: 18/380,985

(22) Filed: Oct. 17, 2023

(65) Prior Publication Data

US 2024/0134081 A1 Apr. 25, 2024
US 2024/0230943 A9 Jul. 11, 2024

Related U.S. Application Data

(60) Provisional application No. 63/418,193, filed on Oct. 21, 2022.

(51) Int. Cl.
*G01V 3/02* (2006.01)
*G01V 3/08* (2006.01)

(52) U.S. Cl.
CPC ................ *G01V 3/083* (2013.01); *G01V 3/02* (2013.01); *G01V 2003/084* (2013.01); *G01V 2003/085* (2013.01); *G01V 2003/086* (2013.01)

(58) Field of Classification Search
CPC . G01V 3/083; G01V 3/08; G01V 3/00; G01V 3/02; G01V 2003/084;
(Continued)

(56) References Cited

U.S. PATENT DOCUMENTS 10,393,910 B2 8/2019 Miles
2009/0284258 A1 11/2009 Morrison et al.
(Continued)

FOREIGN PATENT DOCUMENTS

WO 2012051676 A1 4/2012

*Primary Examiner* — Mohamed Charioui
(74) *Attorney, Agent, or Firm* — SMART & BIGGAR LP; Stephen Beney; Ryan De Vries

(57) ABSTRACT

A geophysical surveying method and assembly applying transient pulses of electric current to an airborne time-domain electromagnetic transmitter to generate a primary controlled electromagnetic field; measuring, using an airborne receiver, a secondary controlled electromagnetic field to generate controlled field data; measuring, using the airborne receiver, a magnetic component of a natural electromagnetic field at an above-ground position to generate first natural field data; measuring, using a ground receiver at a ground station, telluric electrical currents induced by the natural electromagnetic field and/or a magnetic component of the natural electromagnetic field at a ground position to generate second natural field data; merging the first natural field data and the second natural field data into combined natural field data; extracting, from the combined natural field data, off-time natural field data recorded between the pulses; and generating geophysical survey data based on the controlled field data and the off-time natural field data.

20 Claims, 6 Drawing Sheets

(58) Field of Classification Search
CPC ....... G01V 2003/085; G01V 2003/086; G01V 3/16; G01V 3/15
See application file for complete search history.

(56) References Cited

U.S. PATENT DOCUMENTS

| | | | | |
|---|---|---|---|---|
| 2014/0012505 | A1* | 1/2014 | Smith | G01V 3/12 702/2 |
| 2015/0285612 | A1* | 10/2015 | Miles | G01V 3/165 702/150 |
| 2016/0061984 | A1 | 3/2016 | Partner | |
| 2016/0231449 | A1 | 8/2016 | Miles | |
| 2020/0110185 | A1* | 4/2020 | Xu | G01V 1/181 |
| 2020/0241163 | A1 | 7/2020 | Morrison et al. | |

* cited by examiner 188
192
190
140
186
186a
186c
186d
186b
196
194
180
182

GEOPHYSICAL SURVEYING APPARATUS, SYSTEM AND METHOD

CROSS REFERENCE TO RELATED APPLICATIONS

This application claims the benefit of U.S. Provisional Application Ser. No. 63/418,193, filed Oct. 21, 2022, which is hereby incorporated herein by reference.

FIELD

The specification relates generally to geophysical surveying, and, more specifically, to geophysical surveying using controlled and naturally occurring electromagnetic source fields.

BACKGROUND

United States App. Pub. No. 2016/0231449A1 to Miles ("Miles") purports to disclose a composite electromagnetic (EM) system and method for measuring naturally occurring magnetic fields and controlled magnetic fields. Miles purports to disclose that the composite EM system includes a housing, an audio-magnetotelluric (AMT) system attached to the housing and measuring natural magnetic fields generated by earth, a frequency-domain EM (FDEM) system attached to the housing and measuring controlled magnetic fields generated by a controlled source, and a position and orientation (POS) system attached to the housing and configured to calculate an orientation and a position of the AMT system and housing relative to the earth. Miles also purports to disclose that the housing is configured to be attached to an aircraft for being airborne while measuring the natural magnetic fields and the controlled magnetic fields.

SUMMARY

The following summary is intended to introduce the reader to various aspects of the applicant's teaching, but not to define any invention.

According to some aspects, there is provided a method of geophysical surveying of a ground formation, comprising (a) applying transient pulses of electric current to an airborne time-domain electromagnetic transmitter to generate a primary controlled electromagnetic field, the pulses of electric current being applied during on times and spaced from one another by off times; (b) measuring, using an airborne receiver, a secondary controlled electromagnetic field to generate controlled field data, the secondary controlled electromagnetic field resulting from electrical currents induced in the ground formation by the primary controlled electromagnetic field; (c) measuring, using the airborne receiver, a magnetic component of a natural electromagnetic field at an above-ground position to generate first natural field data; (d) measuring, using a ground receiver at a ground station, telluric electrical currents induced by the natural electromagnetic field and/or a magnetic component of the natural electromagnetic field at a ground position to generate second natural field data; (e) merging the first natural field data and the second natural field data into combined natural field data; (f) extracting from the combined natural field data off-time natural field data recorded during the off times; and (g) generating geophysical survey data based on the controlled field data and the off-time natural field data.

In some examples, the airborne time-domain electromagnetic transmitter and the airborne receiver are carried by a common aircraft during steps (a), (b), and (c).

In some examples, the airborne receiver includes a plurality of induction coils.

In some examples, the airborne receiver includes three induction coils each extending in a plane, and the plane of each induction coil is orthogonal to the planes of the other induction coils.

In some examples, the airborne receiver includes an aerodynamically shaped shell, and the induction coils are each enclosed within the aerodynamically shaped shell.

In some examples, the controlled field data and the first natural field data are each amplified prior to steps (e), (f), and (g).

In some examples, the method further comprises capturing first global positioning system information from an airborne global positioning system associated with the airborne receiver and capturing second global positioning system information from a ground global positioning system associated with the ground receiver, wherein step (e) includes using the first and second global positioning system to synchronize the first and second natural field data.

In some examples, the second natural field data includes electric field measurements in two orthogonal directions.

In some examples, the ground receiver includes a first dipole and a second dipole generally parallel to the first dipole, a third dipole generally orthogonal to the first dipole, and a fourth dipole generally parallel to the third dipole.

In some examples, step (g) includes processing the controlled field data to calculate off-time parameters of the secondary magnetic field and calculating apparent conductivities from the off-time natural field data.

According to some aspects, there is provided a geophysical surveying assembly, comprising a time domain electromagnetic transmitter operable to carry transient pulses of electric current to generate a primary controlled electromagnetic field, the pulses of electric current being carried during on times and spaced from one another by off times; an assembly receiver secured to the transmitter, the assembly receiver operable to measure magnetic fields to generate magnetic field data; at least one processor communicatively coupled to the assembly receiver to receive the magnetic field data, the at least one processor operable to: extract controlled field data from the magnetic field data; extract first natural field data from the magnetic field data; extract, from the first natural field data, off-time natural field data recorded during the off times; and generate geophysical survey data based on the controlled field data and the off-time natural field data.

In some examples, the assembly is mounted to an aircraft to be carried by the aircraft.

In some examples, the assembly is suspended from the aircraft to be towed by the aircraft.

In some examples, the first receiver includes a plurality of induction coils.

In some examples, the first receiver includes three induction coils each extending in a plane, and the plane of each induction coil is orthogonal to the planes of the other induction coils.

In some examples, the first receiver includes an aerodynamically shaped shell, and the induction coils are each enclosed within the aerodynamically shaped shell.

In some examples, the at least one processor is coupled to the first receiver via an amplifier, the amplifier operable to amplify the magnetic field data before the magnetic field data is received by the processor.

According to some aspects, there is provided a system comprising a geophysical surveying assembly, a ground receiver at a ground station, the ground receiver operable to measure telluric electrical currents induced by a natural electromagnetic field and/or a magnetic component of the natural electromagnetic field to generate second natural field data; and wherein the at least one processor is communicatively coupled to the ground receiver to receive the second natural field data, and the at least one processor is operable to: merge the first natural field data and the second natural field data into combined natural field data; and extracting the off-time natural field data from the combined natural field data.

In some examples, the assembly further includes an airborne global positioning system and the ground station further includes a ground global positioning system, the magnetic field data including information from the airborne global positioning system and the second natural field data including information from the ground global positioning system.

In some examples, the ground receiver includes a first dipole and a second dipole generally parallel to the first dipole, a third dipole generally orthogonal to the first dipole, and a fourth dipole generally parallel to the third dipole.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Figure 1:
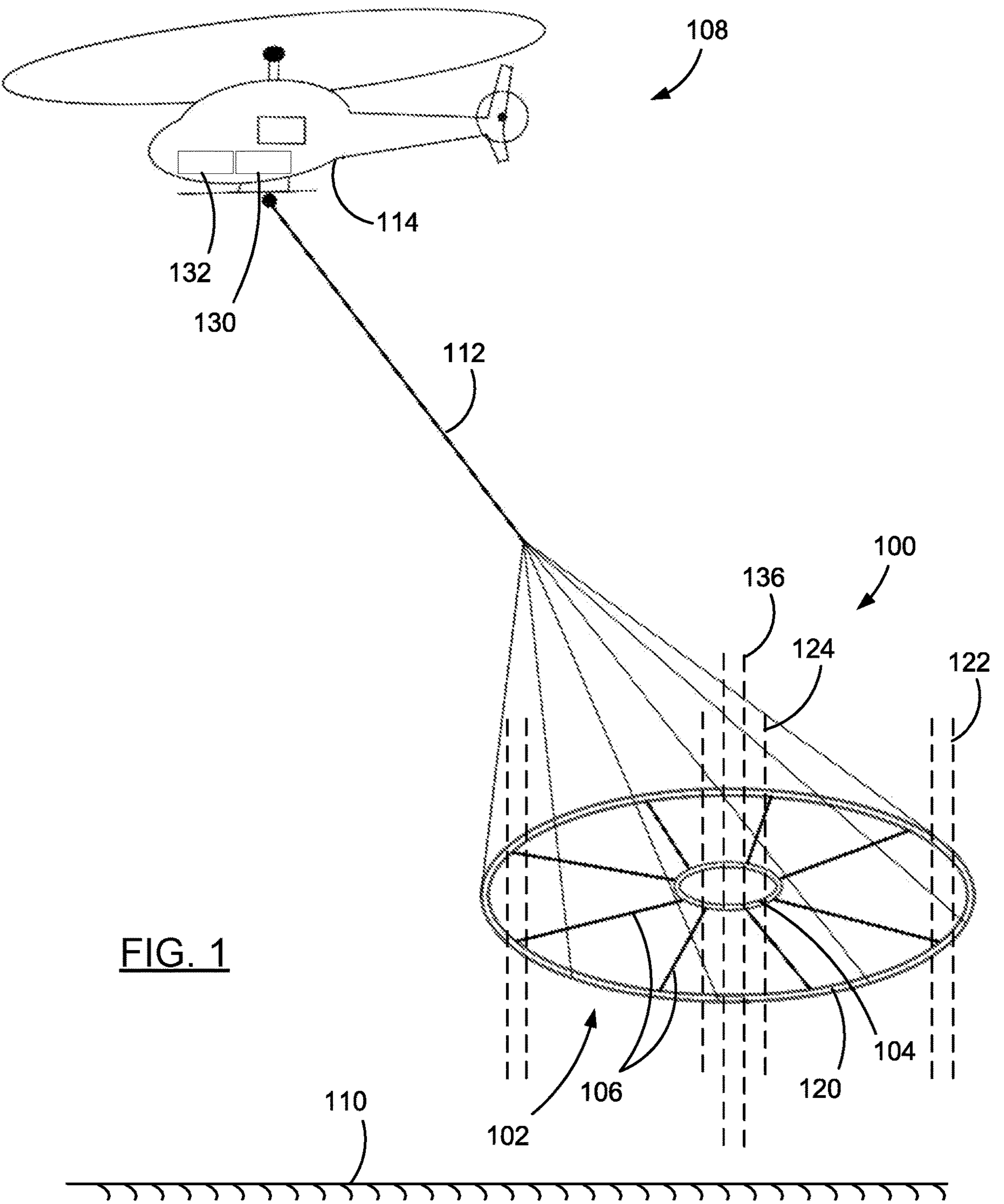
FIG. 1 is a perspective view of a geophysical surveying assembly according to an embodiment, towed by aircraft.

Referring to FIG. 1, an example geophysical surveying assembly 100 is shown. The survey system 100 includes a transmitter 102 and a receiver 104. As exemplified, the transmitter 102 and the receiver 104 are secured to one another. It will be appreciated that the transmitter 102 and the receiver 104 may be secured to one another in any suitable way. In some embodiments, the transmitter 102 and the receiver 104 are secured to one another with a generally constant separation between them. The transmitter 102 and the receiver 104 may be rigidly secured together to move as one body. In some embodiments, as exemplified, the transmitter 102 encircles the receiver 104 and the two are joined by a plurality of spokes 106 each extending from the transmitter 102 to the receiver 104.

The assembly 100 is sized and shaped to be carried by an aircraft 108. The aircraft 108 may be any suitable aircraft, such as a drone, an airplane, or, as illustrated, a helicopter. The aircraft 108 is operable to carry the assembly 100 in flight. The aircraft 108 can be used to carry the assembly 100 over a ground formation 110 to survey the ground formation 110. It will be appreciated that the assembly 100 may be mounted to the aircraft 108 in any suitable way. As exemplified, in some embodiments the assembly 100 is suspended from the aircraft 108 by a line 112 (e.g., a line secured to the main body 114 of the aircraft 108). The assembly 100 may be towed by the aircraft 108 via the line 112.

The transmitter 102 is a time domain electromagnetic transmitter. The transmitter 102 is a broadband transmitter emitting a wide range of frequencies. The assembly 100 includes a time domain transmitter 102 for deep penetration into the ground formation 110. In some embodiments, the time domain system (i.e., the transmitter 102 and receiver 104 and a data collection system) is able to provide information about the ground formation 110 to a depth of more than 200 meters, more than 500 meters or more than 1000 meters.

The transmitter 102 includes a loop 120. As exemplified, the loop 120 may extend in a plane. In some embodiments, the assembly 100 is mounted to the aircraft 108 such that the plane in which the loop 120 extends is generally parallel to the ground formation 110.

Figure 2:
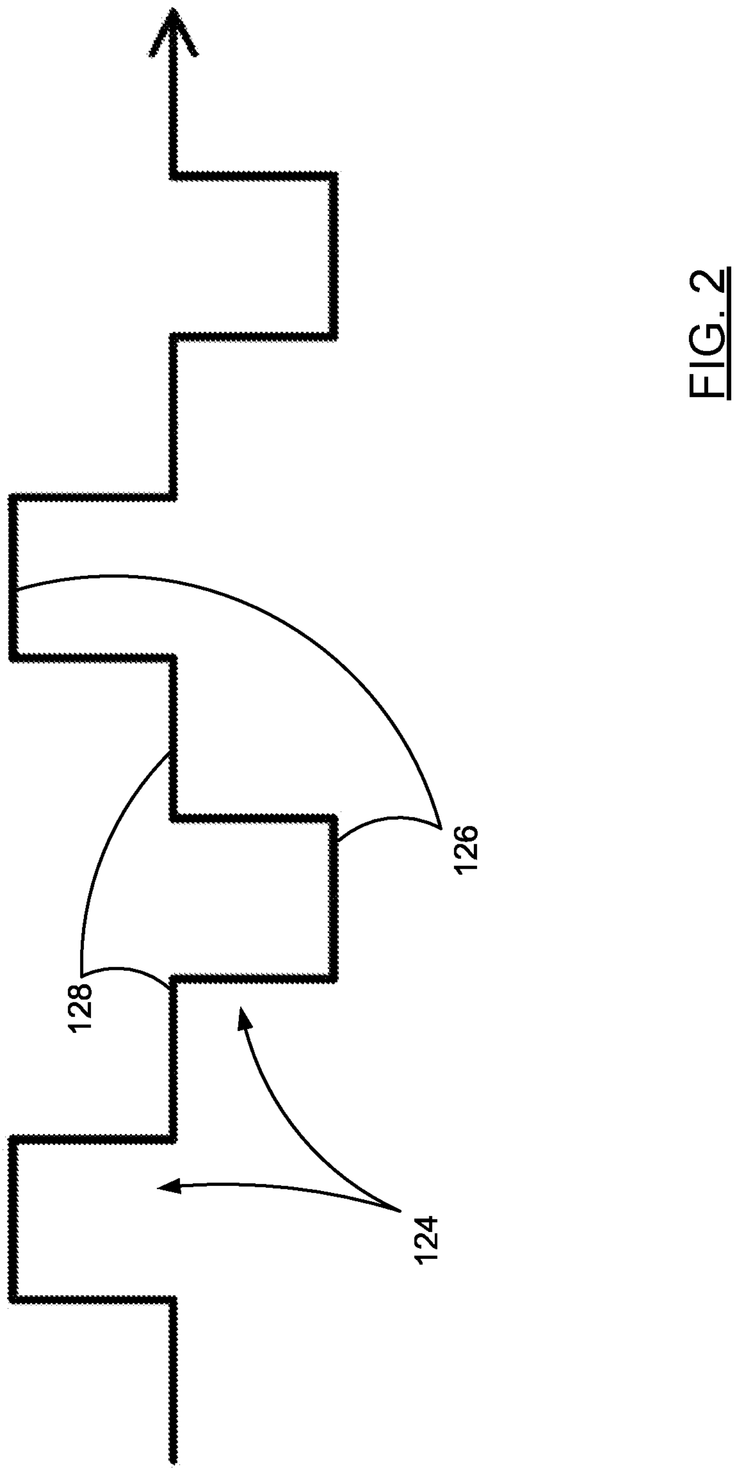
FIG. 2 is a schematic illustration of an output of a transmitter of the geophysical surveying assembly of FIG. 1.

Referring to FIG. 2, the transmitter is operable to carry transient pulses 124 of electric current. The pulses 124 are carried during on times 126 and spaced from one another by off times 128.

Referring again to FIG. 1, it will be appreciated that the transient pulses of electric current generate a primary controlled electromagnetic field 122. The primary controlled electromagnetic field 122 can be used to induce electrical currents in the ground formation 110, resulting in a secondary controlled electromagnetic field 124 in response to the changing primary controlled electromagnetic field 122. The secondary controlled electromagnetic field 124 carries information about the ground formation 110.

The transmitter 102 may include a power supply 130 coupled to the loop 120 to provide the current to the loop, and a control system 132 (e.g., a processor and data storage device) operable to govern the supply of power from the power supply to the loop according to a predetermined schedule. For example, the control system 132 may include a processor and data storage device, the data storage device storing the predetermined schedule, and the processor communicatively coupled to the data storage device to receive the predetermined schedule and coupled to the power supply to govern the supply of power to the loop.

It will be appreciated that in some embodiments, as exemplified, the power supply 130 may be provided separately from the transmitter 102. For example, the power supply may be provided in the aircraft 108 and coupled to the loop 120 via an electrical connection extending from the aircraft to the transmitter 102. It will be appreciated that in some embodiments, as exemplified, the control system 132 may be provided separately from the transmitter 102. For example, the transmitter 102 may be controlled by the data acquisition system described below, or by another, separate system.

Figure 3:
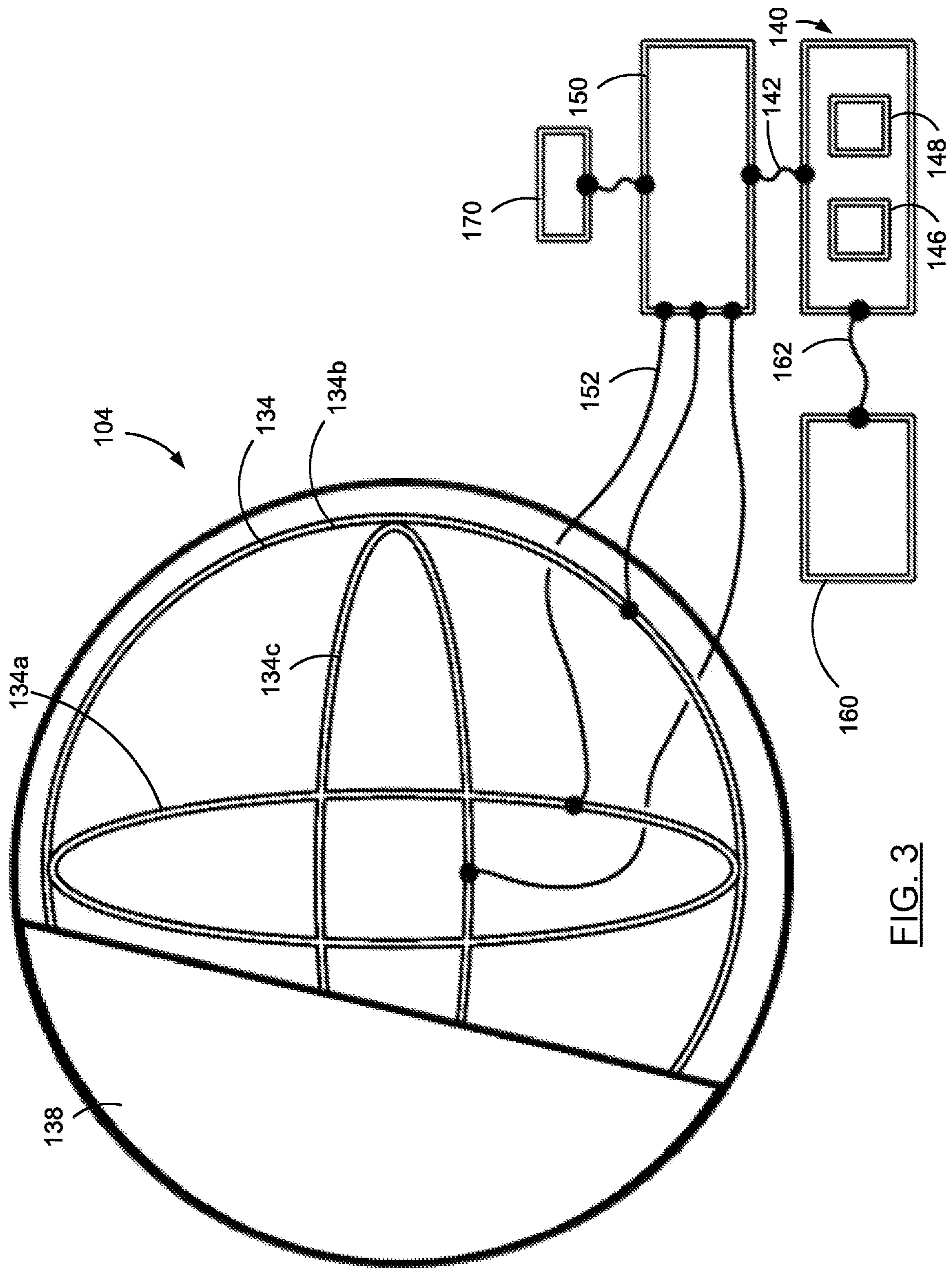
FIG. 3 is a perspective view of a receiver of the geophysical surveying assembly of FIG. 1.

Referring now to FIG. 3, the receiver 104 is operable to measure magnetic fields. The receiver 104 includes an induction coil 134. An electric current is induced in the induction coil 134 by a changing magnetic field. It will be appreciated that the receiver 104 can be used to measure the secondary controlled electromagnetic field 124.

The receiver 104 can also be used to measure a natural magnetic field 136 (FIG. 1). In some embodiments, the same receiver 104 is used to measure both the secondary magnetic field and the natural magnetic field, though it will be appreciated that in some embodiments the assembly may include more than one receiver with one used to measure a natural magnetic field and one used to measure the secondary controlled electromagnetic field. In some embodiments, the output of the assembly receiver 104 is a single, continuous signal. Natural electromagnetic fields in the audio frequency band (1 Hz-20 kHz) are mainly associated with lightning discharges. Thunderstorms release energy, some of which is converted to electromagnetic fields that propagate through the ionosphere-Earth interspace. The electromagnetic fields and currents induced by these fields in the subsurface may be useful in magnetotelluric surveying to measure the electrical resistivity of the subsurface. Natural electromagnetic fields generated by lightning discharges at some distance from the source propagate as plane waves with a horizontal magnetic field perpendicular to the direction of propagation. The presence of lateral conductivity variations gives rise to a vertical magnetic field component related to the distortion of the subsurface current pattern. An airborne receiver may measure magnetic components of the natural audio frequency electromagnetic fields. Information from the natural magnetic field 136 assists in detecting highly conductive objects and barely conductive objects in the earth formation 110. Combining data from the secondary magnetic field 124 and the natural magnetic field 136 produces better-quality data.

In some embodiment, the receiver 104 includes a plurality of induction coils 134. In some embodiments, the receiver 104 includes three induction coils 134*a*, 134*b*, and 134*c*, each extending in a plane, and arranged such that the planes are mutually orthogonal. In some embodiments, the receiver 104 includes an aerodynamically shaped shell 138, and the induction coil or coils are enclosed by the shell 138.

The receiver 104 is operable to output magnetic field data that is representative of a measured magnetic field. The magnetic field data is sent to a data acquisition system 140. The data acquisition system 140 includes a processor 146. The data acquisition system 140 may include a data storage device 148 communicatively coupled to the processor 146. It will be appreciated that the data acquisition system 140 may include a plurality of processors 146 and/or a plurality of data storage devices 148.

The receiver 104 is communicatively coupled to the data acquisition system 140 via a connection 142, and the connection 142 may be wired and/or wireless. It will be appreciated that the assembly 100 may include an on-board data acquisition system 140 as part of the assembly 100, and the magnetic field data may be sent to the on-board data acquisition system (e.g., via a wired connection 142). Additionally, or alternatively, the magnetic field data may be sent to a remote data acquisition system 140 (e.g., via a wireless connection 142). The remote data acquisition system 140 is remote from the assembly 100, and may be, e.g., on board the aircraft 108 or a remote server that is remote from both the aircraft 108 and the assembly 100.

In some embodiments, the magnetic field data from the receiver 104 is sent to an amplifier 150 prior to being sent to the data acquisition system 140. The amplifier 150 is operable to amplify a signal of the magnetic field data. The receiver 104 is communicatively coupled to the amplifier 150 via a connection 152, and the connection 152 may be wired and/or wireless. It will be appreciated that the assembly 100 may include an on-board amplifier 150 as part of the assembly 100, and the magnetic field data may be sent to the on-board amplifier 150 (e.g., via a wired connection 152). Additionally, or alternatively, the magnetic field data may be sent to a remote amplifier 150 (e.g., via a wireless connection 152). The remote amplifier 150 is remote from the assembly 100, and may be, e.g., on board the aircraft 108 or at a remote server that is remote from both the aircraft 108 and the assembly 100.

In some embodiments, the assembly 100 includes a global positioning system 160. The global positioning system 160 is operable to output position data and/or clock data. The output of the global positioning system 160 is included with the magnetic field data provided to the data acquisition system 140. The output of the global positioning system 160 may be added to the magnetic field data provided over connection 142 or sent separately via connection 162, and the connection 162 may be a wired or wireless connection.

In some embodiments, the assembly 100 includes a wireless transmitter 170 to wirelessly send data. For example, the wireless transmitter 170 may be used to wirelessly form one or more of the connection 142, the connection 152, and the connection 162.

Figure 4:
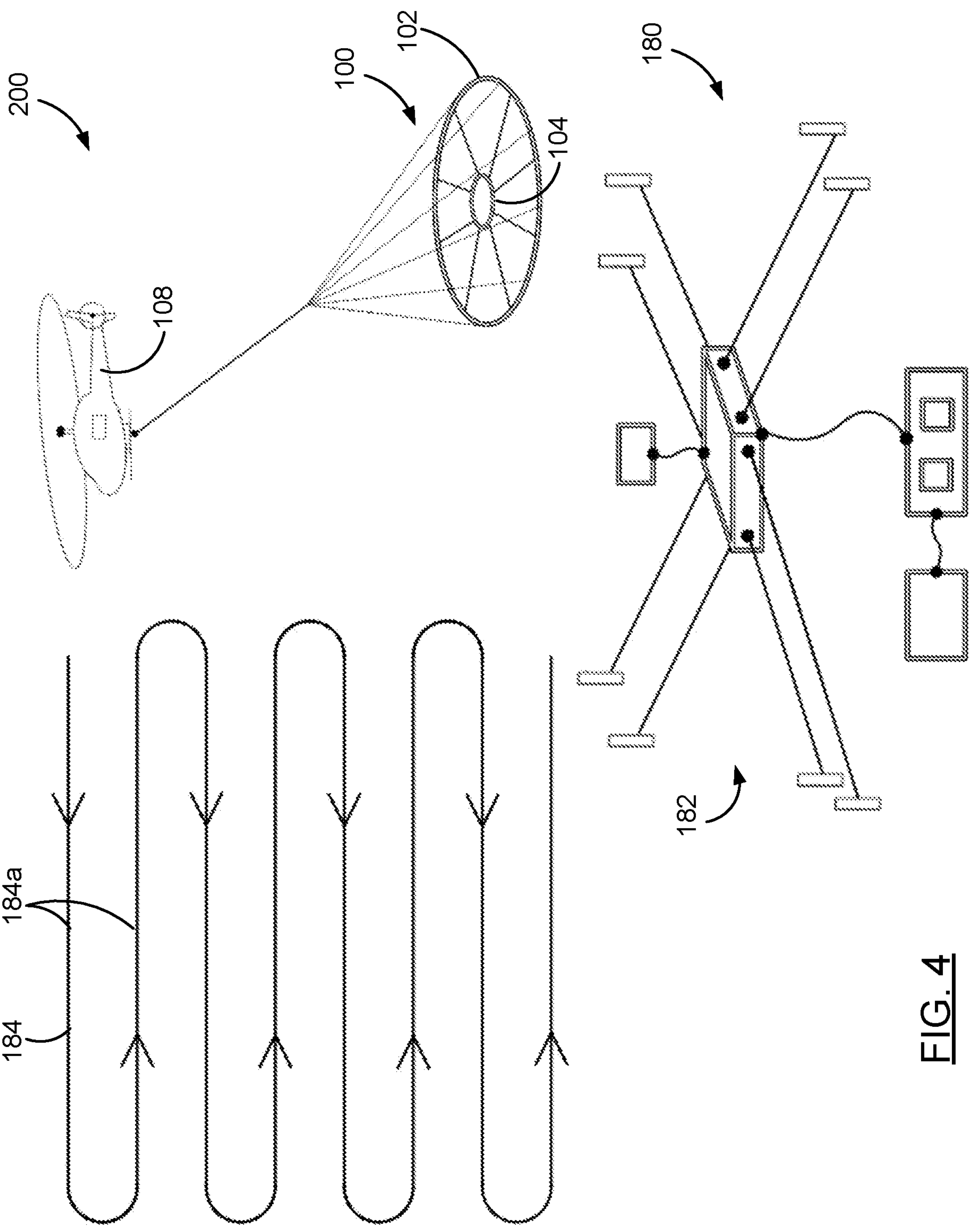
FIG. 4 is a perspective view of a geophysical surveying system, according to an embodiment.

Referring now to FIG. 4, in some embodiments, the assembly 100 is used in connection with a ground station 180. In addition to the assembly receiver 104, a ground base station may be used to measure magnetic components of the natural audio frequency electromagnetic fields, simultaneously with the assembly receiver 104 measuring the magnetic components of the natural audio frequency electromagnetic fields in the air. Additionally, or alternatively, the ground base station may be used to measure telluric currents induced by natural electromagnetic fields in the subsurface on the ground, simultaneously with the assembly receiver 104 measuring the magnetic components of the natural audio frequency electromagnetic fields in the air. Including data from the ground base station 180 improves the overall data quality generated.

Surveying system 200 includes the ground station 180 and the assembly 100 mounted to the aircraft 108. The ground station 180 includes a receiver 182. The receiver 182 is operable to measure telluric electrical currents induced by the natural electromagnetic field 136 (e.g., using a dipole) and/or a magnetic component of the natural electromagnetic field 136 (e.g., using an induction coil). The receiver 182 generates second natural field data set.

Including data about the natural electromagnetic field 136 from the ground base station 180 provides more accurate measurement of the natural electromagnetic field 136, at least due to the reduction of noise coming from the aircraft 108 as compared to data about the natural electromagnetic field 136 from the assembly receiver 104. The ground base station 180 measuring naturally occurring electric fields provides the opportunity to calculate the apparent conductivities of the ground formation 110 in addition to the opportunity to calculate the tilt of the natural magnetic fields using data from the assembly receiver 102.

In some embodiments, the aircraft 108 follows a path 184. The path 184 may be a zig-zag path including a plurality of generally parallel portions 184*a* at generally equal spacings from one another. It will be appreciated that the path 184 may take a different form. The path 184 may be within a maximum distance of the ground station 180. The maximum distance may be 100 kilometers, 75 kilometers, or 50 kilometers.

Figure 5:
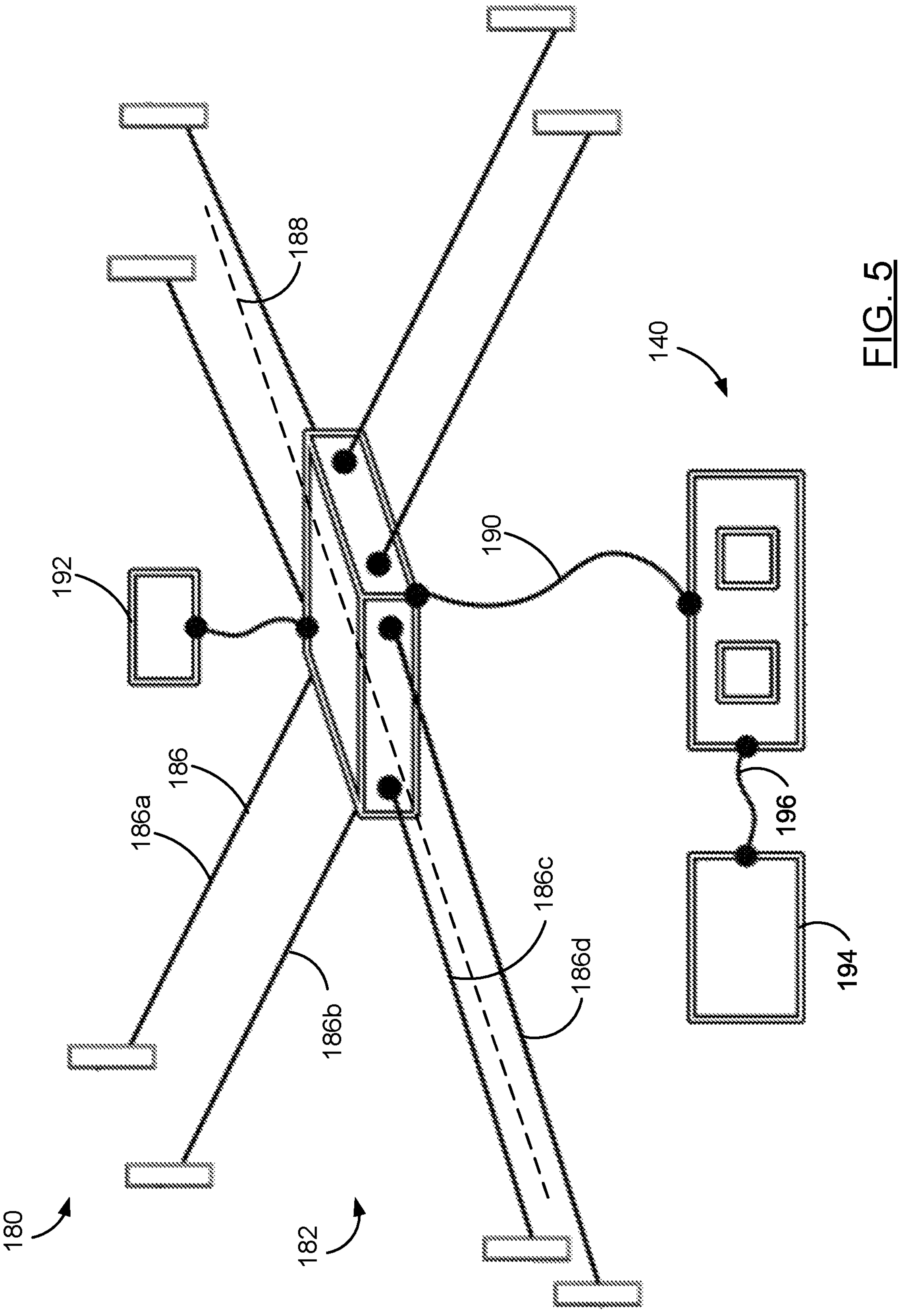
FIG. 5 is a perspective view of a ground receiver of the geophysical surveying system of FIG. 4.

Referring now to FIG. 5, in some embodiments, the receiver 182 includes a dipole 186 to measure an electric field. The dipole 186 extends along an axis 188. As exemplified, in some embodiments, the receiver 182 includes a plurality of dipoles 186. The receiver 182 may include a first dipole 186*a* and a second dipole 186*b* generally parallel to one another. The receiver 182 may also include a third dipole 186*c* and a fourth dipole 186*d* generally parallel to one another and orthogonal to the first and second dipoles 186*a*, 186*b*.

The receiver 182 is operable to output second natural field data that is representative of measured telluric electrical currents induced by the natural electromagnetic field 136 and/or a magnetic component of the natural electromagnetic field 136. The second natural field data is sent to the data acquisition system 140. The receiver 182 is communicatively coupled to the data acquisition system 140 via a connection 190, and the connection 190 may be wired and/or wireless.

In some embodiments, the ground station 180 includes a global positioning system 194. The global positioning system 194 is operable to output position data and/or clock data. The output of the global positioning system 194 is included with the second natural field data provided to the data acquisition system 140. The output of the global positioning system 194 may be added to the magnetic field data provided over connection 190 or sent separately via connection 196, and the connection 196 may be a wired or wireless connection.

The ground station 180 may include a wireless transmitter 192 to wirelessly send data. The wireless transmitter 192 may be used to wirelessly form connection 190 and/or connection 196.

It will be appreciated that in some embodiments the assembly 100 may output data to a first data acquisition system 140 while the ground station 180 outputs data to a second, separate data acquisition system 140. The data may then be processed by a processor 146 of the first data acquisition system 140, the second data acquisition system 140, or a separate system (e.g., an external server or a third data acquisition system 140).

The processor 146 is operable to extract controlled field data from the magnetic field data. In some embodiments, the controlled field data includes or consists of output of the receiver 104 from time windows during the off-time intervals 128. In some embodiments, the controlled field data include all or substantially all of the signal from the off-time intervals 128, though it will be appreciated that the controlled field data may include a subset of the signal from the off-time intervals 128 (e.g., the first or last 80%, 90%, or 99% of the time duration of the off-time interval 128). The processor 146 is also operable to extract first natural field data from the magnetic field data. In some embodiments, the first natural field data includes or consists of the transformation of the output of the receiver 104 to the frequency domain (e.g., using a fast Fourier transform (FFT)) for selected frequencies (e.g., a selected range of frequencies). It will be appreciated that the selected frequencies may be any appropriate frequencies, and may depend on local weather patterns such as the location of nearby thunderstorms. In some embodiments, all or a broad range of frequencies are captured, and the frequencies selected are those for which the signal is the strongest.

The processor 146 is operable to extract, from the natural field data, off-time natural field data recorded during the off times 128. Since the transmitter 102 is a broadband transmitter emitting a wide range of frequencies, these frequencies obscure the naturally occurring audio frequency response. This difficulty is avoided by using the natural field data measured when the transmitter 102 is off. For example, the transmitter 104 may have a 30 Hz base frequency and a 7 millisecond pulse. The off times 128 are then each 9.66 milliseconds long, with 60 intervals per second. In some embodiments the off-time natural field data is the data recorded during each 9.6 millisecond interval immedicably after the transmitter 102 is turned off (i.e., 0.576 seconds of off-time natural field data per 1 second interval).

In some embodiments, the processor 146 extracts the off-time natural field data from the first natural field data from the assembly receiver 102. In some embodiments, the processor 146 is operable to first combine the first natural field data from the assembly receiver 102 with the second natural field data from the ground receiver 182, and then extract the off-time natural field data from the combined natural field data.

In some embodiments, the airborne receiver signal and the ground receiver signals are merged before being transformed to the frequency domain. In some embodiments, the airborne receiver signal and the ground receiver signals are merged and/or transformed to the frequency domain before the off-time data is extracted to generate the off-time natural field data.

The processor 146 is operable to generate geophysical survey data based on the controlled field data and the off-time natural field data. In some embodiments, the processor 146 is operable to process the controlled field data to calculate off-time parameters of the secondary magnetic field. The off-time parameters of the secondary magnetic field may include or consist of the decay of the secondary magnetic field during the off times.

In some embodiments, the processor 146 is operable to calculate apparent conductivities from the off-time natural field data. The off-time natural field data is used for the calculation of apparent conductivities according to the formula:

$$\sigma = \mu\omega|Y^2|$$

In the formula, μ is the magnetic permeability of free air and ω is the angular frequency. Y is the determinant of the following matrix, in which $H_x$, $H_y$, and $H_z$ are the measured three orthogonal magnetic field components, and $E_x$, $E_y$ are the horizontal electric field components measure by the base station 180:

$$\begin{bmatrix} Hx \\ Hy \\ Hz \end{bmatrix} = \begin{bmatrix} Yxx & Yxy \\ Yyx & Yyy \\ Yzx & Yzy \end{bmatrix} \begin{bmatrix} Ex \\ Ey \end{bmatrix}$$

The apparent conductivities are calculated without measuring the attitude of the assembly receiver 104. In some embodiments, the apparent conductivities are measured instead of measuring the tipper (the ratio of the horizontal magnetic field and the vertical magnetic field).

In some embodiments, the processor 146 is operable to generate the geophysical survey data based on the off-time parameters of the secondary magnetic field and the apparent conductivities. Survey data may be used in generating a user report. The user report may include survey data and/or survey data applied to, e.g., mapping. In some embodiments, survey data is processed and interpretations are provided. For example, survey data may be processed and interpretations provided by software, e.g., Oasis Montaj™ by Seequent Technologies™ or Maxwell EM™ software by ElectroMagnetic Imaging Technology Pty Ltd™.

Figure 6:
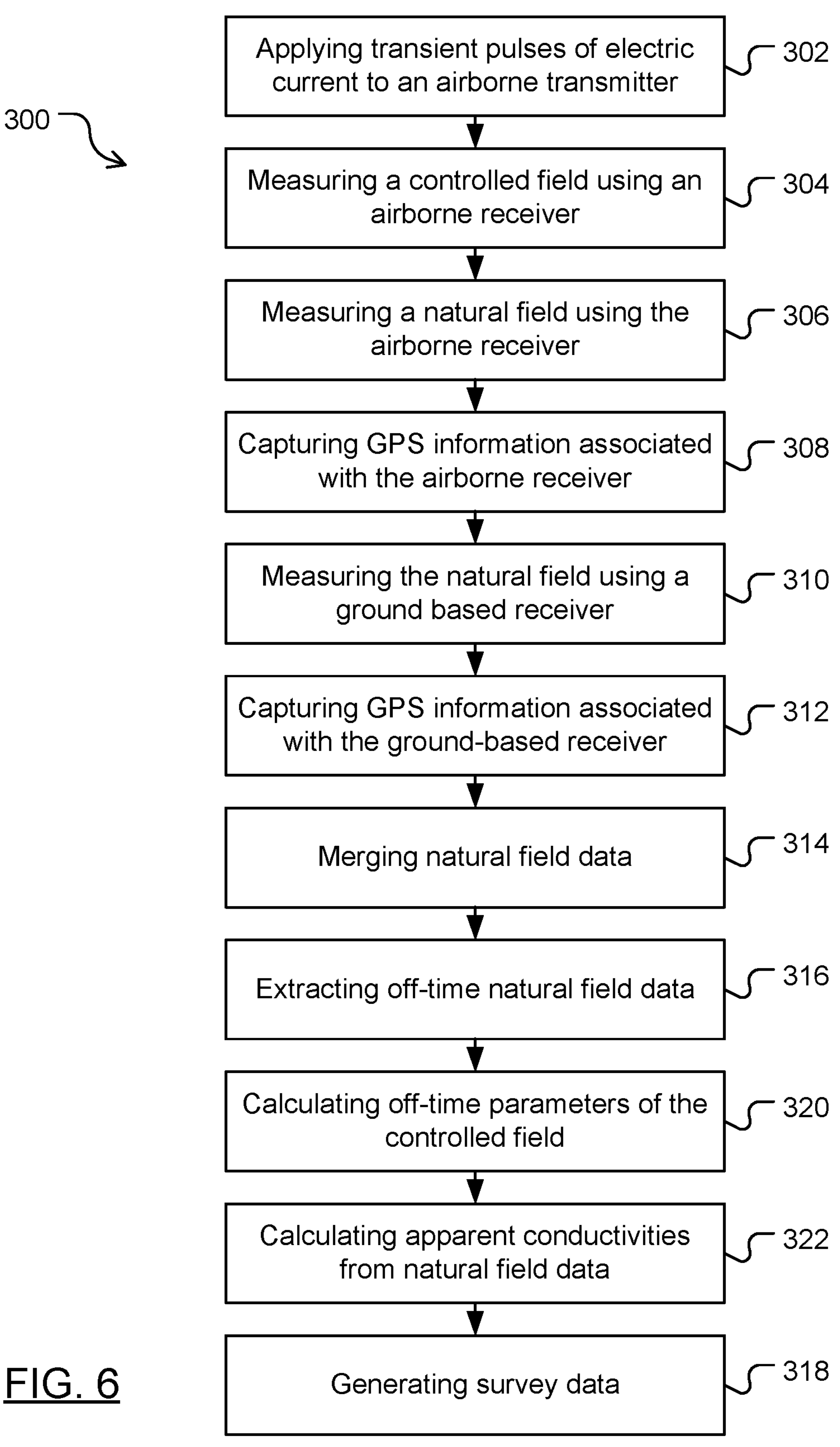
FIG. 6 is a flow chart of a method of geophysical surveying according to an embodiment.

Referring to FIG. 6, illustrated is a method 300 of geophysical surveying of a ground formation 110. The method 300 includes, at step 302, applying transient pulses of electric current to an airborne time-domain electromagnetic transmitter 102 to generate a primary controlled electromagnetic field 122. The pulses of electric current are applied during on times 126 and spaced from one another by off times 128.

Method 300 also includes, at step 304, measuring, using an airborne receiver 104, a secondary controlled electromagnetic field 124 to generate controlled field data. The secondary controlled electromagnetic field 124 results from electrical currents induced in the ground formation 110 by the primary controlled electromagnetic field 122. Method 300 also includes, at step 306, measuring, using the airborne receiver 104, a magnetic component of a natural electromagnetic field 136 at an above-ground position to generate first natural field data.

Method 300 may include, at step 308, capturing global positioning system (GPS) information from an airborne global positioning system 160 associated with the airborne receiver 104. The airborne receiver 104 may be mounted to the same aircraft 108 as the transmitter 102 during steps 302, 304, 306, and 308.

At step 310, method 300 includes measuring, using a ground receiver 182 at a ground station 180, telluric electrical currents induced by the natural electromagnetic field 136 and/or a magnetic component of the natural electromagnetic field 136 at a ground position to generate second natural field data. The second natural field data may include electric filed measurements in two orthogonal directions. In some embodiments, the second natural field data includes data from a first dipole **186*a* and a second dipole 186*b* generally parallel to the first dipole 186*a*, a third dipole 186*c* generally orthogonal to the first dipole 186*a*, and a fourth dipole 186*d* generally parallel to the third dipole 186*c*. The method 300 may include, at step 312, capturing global positioning system information from a ground based global positioning system 194 associated with the ground receiver 182**.

At step 314, the method 300 includes merging the first natural field data and the second natural field data into combined natural field data. Merging the first and second natural field data may include using the first and second global positioning system information captured by the airborne global positioning system 160 and the ground based global positioning system 194 to synchronize the first and second natural field data.

At step 316, method 300 includes extracting from the combined natural field data off-time natural field data recorded during the off times.

Method 300 includes, at step 318, generating geophysical survey data based on the controlled field data and the off-time natural field data. Method 300 may include, at step 320, processing the controlled field data to calculate off-time parameters of the secondary magnetic field. Method 300 may include, at step 322, calculating apparent conductivities from the combined natural field data. Step 318 may include using the off-time parameters of the secondary magnetic field and/or the apparent conductivities. In some embodiments, method 300 may include generating a user report from the geophysical survey data. Generating a user report may include processing and/or interpreting the geophysical survey data. For example, survey data may be processed and interpretations provided by, e.g., Oasis Montaj™ by Seequent Technologies™ or Maxwell EM™ software by ElectroMagnetic Imaging Technology Pty Ltd™.

The invention claimed is:

1. A method of geophysical surveying of a ground formation, comprising:

a. applying transient pulses of electric current to an airborne time-domain electromagnetic transmitter tog generate a primary controlled electromagnetic field, the pulses of electric current being applied during on times and spaced from one another by off times;

b. measuring, using an airborne receiver, a secondary controlled electromagnetic field to generate controlled field data, the secondary controlled electromagnetic field resulting from electrical currents induced in the ground formation by the primary controlled electromagnetic field;

c. measuring, using the airborne receiver, a magnetic component of a natural electromagnetic field at an above-ground position to generate first natural field data;

d. measuring, using a ground receiver at a ground station, telluric electrical currents induced by the natural electromagnetic field and/or a magnetic component of the natural electromagnetic field at a ground position to generate second natural field data;

e. merging the first natural field data and the second natural field data into combined natural field data;

f. extracting from the combined natural field data off-time natural field data recorded during the off times to suppress interference from the controlled electromagnetic fields and improve detection of naturally occurring electromagnetic signals from the natural electromagnetic field; and g. generating geophysical survey data based on the controlled field data and the off-time natural field data.

2. The method of claim 1, wherein the airborne receiver includes a plurality of induction coils.

3. The method of claim 2, wherein the airborne receiver includes three induction coils each extending in a plane, and the plane of each induction coil is orthogonal to the planes of the other induction coils.

4. The method of claim 3, wherein the airborne receiver includes an aerodynamically shaped shell, and the induction coils are each enclosed within the aerodynamically shaped shell.

5. The method of claim 1, wherein the second natural field data includes electric field measurements in two orthogonal directions.

6. The method of claim 5, wherein the ground receiver includes a first dipole and a second dipole generally parallel to the first dipole, a third dipole generally orthogonal to the first dipole, and a fourth dipole generally parallel to the third dipole.

7. The method of claim 1, wherein the airborne time-domain electromagnetic transmitter and the airborne receiver are carried by a common aircraft during steps (a), (b), and (c).

8. The method of claim 1, wherein the controlled field data and the first natural field data are each amplified prior to steps (e), (f), and (g).

9. The method of claim 1, further comprising capturing first global positioning system information from an airborne global positioning system associated with the airborne receiver and capturing second global positioning system information from a ground global positioning system associated with the ground receiver, wherein step (e) includes using the first and second global positioning system to synchronize the first and second natural field data.

10. The method of claim 1, wherein step (g) includes processing the controlled field data to calculate off-time parameters of the secondary magnetic field and calculating apparent conductivities from the off-time natural field data.

11. A geophysical surveying system, comprising:

a. a geophysical surveying assembly to be carried by an aircraft, including;

a time domain electromagnetic transmitter operable to carry transient pulses of electric current to generate a primary controlled electromagnetic field, the pulses of electric current being carried during on times and spaced from one another by off times, and an assembly receiver secured to the transmitter, the assembly receiver operable to measure magnetic fields to generate magnetic field data, b. a ground receiver at a ground station, the ground receiver operable to measure telluric electrical currents induced by a natural electromagnetic field and/or a magnetic component of the natural electromagnetic field to generate second natural field data; and c. at least one processor communicatively coupled to the assembly receiver to receive the magnetic field data and communicatively coupled to the ground receiver to receive the second natural field data, the at least one processor operable to:

i. extract controlled field data from the magnetic field data, ii. extract first natural field data from the magnetic field data, iii. merge the first natural field data and the second natural field data into combined natural field data; and iv. extract off-time natural field data from the combined natural field data to suppress interference including from the controlled electromagnetic fields and improve detection of naturally occurring electromagnetic signals from the natural electromagnetic field, and v. generate geophysical survey data based on the controlled field data and the off-time natural field data.

12. The assembly of claim 11, wherein the first receiver includes a plurality of induction coils.

13. The assembly of claim 12, wherein the first receiver includes three induction coils each extending in a plane, and the plane of each induction coil is orthogonal to the planes of the other induction coils.

14. The assembly of claim 13, wherein the first receiver includes an aerodynamically shaped shell, and the induction coils are each enclosed within the aerodynamically shaped shell.

15. The assembly of claim 11, wherein the assembly is mounted to the aircraft to be carried by the aircraft.

16. The assembly of claim 15, wherein the assembly is suspended from the aircraft to be towed by the aircraft.

17. The assembly of claim 11, wherein the at least one processor is coupled to the first receiver via an amplifier, the amplifier operable to amplify the magnetic field data before the magnetic field data is received by the processor.

18. The system of claim 11, wherein the assembly further includes an airborne global positioning system and the ground station further includes a ground global positioning system, the magnetic field data including information from the airborne global positioning system and the second natural field data including information from the ground global positioning system.

19. The system of claim 11, wherein the ground receiver includes a first dipole and a second dipole generally parallel to the first dipole, a third dipole generally orthogonal to the first dipole, and a fourth dipole generally parallel to the third dipole.

20. A geophysical surveying system for surveying a ground formation, the geophysical surveying system comprising at least one processor operable to:

a. receive controlled field data generated from a secondary controlled electromagnetic field measured by an airborne receiver, the secondary controlled electromagnetic field resulting from electrical currents induced in the ground formation by a primary controlled electromagnetic field generated by transient pulses of electric current applied to an airborne time-domain electromagnetic transmitter, the pulses of electric current having been applied during on times and spaced from one another by off times;

b. receive first natural field data generated from a magnetic component of a natural electromagnetic field measured at an above-ground position by the airborne receiver;

c. receive second natural field data generated from telluric electrical currents induced by the natural electromagnetic field and/or a magnetic component of the natural electromagnetic field measured at a ground position by a ground receiver at a ground station;

d. merge the first natural field data and the second natural field data into combined natural field data;

e. extract from the combined natural field data off-time natural field data recorded during the off times to suppress interference from an environment at the above-ground position and improve detection of naturally occurring electromagnetic signals from the natural electromagnetic field; and f. generate geophysical survey data based on the controlled field data and the off-time natural field data.

* * * * *